(12) United States Patent
Stefes et al.

(10) Patent No.: US 11,358,707 B2
(45) Date of Patent: Jun. 14, 2022

(54) FLOW GUIDE BODY FOR AN AIRCRAFT

(71) Applicants: Airbus Operations GmbH, Hamburg (DE); NAVASTO GmbH, Berlin (DE)

(72) Inventors: Bruno Stefes, Hamburg (DE); Matthias Bauer, Berlin (DE); Jakob Lohse, Berlin (DE)

(73) Assignees: Airbus Operations GmbH; NAVASTO GmbH

( * ) Notice: Subject to any disclaimer, the term of this patent is extended or adjusted under 35 U.S.C. 154(b) by 288 days.

(21) Appl. No.: 16/580,029

(22) Filed: Sep. 24, 2019

(65) Prior Publication Data

US 2020/0102066 A1  Apr. 2, 2020

(30) Foreign Application Priority Data

Sep. 28, 2018 (DE) ...................... 10 2018 124 137.2

(51) Int. Cl.
  B64C 21/04 (2006.01)
  B64C 23/06 (2006.01)
  (Continued)

(52) U.S. Cl.
  CPC ............... B64C 21/04 (2013.01); B64C 9/00 (2013.01); B64C 21/08 (2013.01); B64C 23/069 (2017.05);
  (Continued)

(58) Field of Classification Search
  CPC ..... B64C 27/46; B64C 27/463; B64C 27/467; B64C 27/476; B64C 2027/7227;
  (Continued)

(56) References Cited

U.S. PATENT DOCUMENTS

| 3,117,593 A | 1/1964 | Sowers, III |
| 4,382,569 A * | 5/1983 | Boppe ................... B64C 23/069 |
| | | 244/199.4 |

(Continued)

FOREIGN PATENT DOCUMENTS

| DE | 10 2009 034 417 A1 | 1/2011 |
| DE | 10 2010 048 123 A1 | 4/2012 |

(Continued)

OTHER PUBLICATIONS

Schueller M et al: "Fluidic actuators for active flow control on airframe", Proceedings of SPIE [Proceedings of SPIE ISSN 0277-786X vol. 10524], SPIE, US, vol. 9801, Apr. 16, 2016 (Apr. 16, 2016), pp. 980103-980103, XP060070586, DOI: 10.1117/12.2219175 ISBN: 978-1-5106-1533-5.

(Continued)

*Primary Examiner* — Joshua J Michener
*Assistant Examiner* — Cindi M Curry
(74) *Attorney, Agent, or Firm* — Lerner, David, Littenberg, Krumholz & Mentlik, LLP

(57) ABSTRACT

A flow guide body for an aircraft includes a main body having an outer aerodynamic surface having a plurality of outlet openings, and flow control devices, each having an inlet, an interaction chamber, a first outlet and a second outlet. A first control inlet is connected to the interaction chamber at the first side of the chamber axis. The outlets are each connected to outlet openings in the aerodynamic surface. Each outlet has a control outlet. A second flow control device is arranged such that one outlet is connected with the inlet of the first flow control device. One of the control outlets of the first flow control device is connected to the first control inlet of the first flow control device, and the other of the control outlets of the first flow control device is con- (Continued)

nected to the first control inlet of the second flow control device.

14 Claims, 6 Drawing Sheets

(51) Int. Cl.
  *B64C 9/00* (2006.01)
  *B64C 21/08* (2006.01)
  *F15D 1/00* (2006.01)
(52) U.S. Cl.
  CPC .......... *F15D 1/008* (2013.01); *B64C 2230/04* (2013.01); *B64C 2230/06* (2013.01); *B64C 2230/22* (2013.01)
(58) Field of Classification Search
  CPC .............. B64C 2027/725; B64C 27/82; B64C 27/8245; B64C 11/18; B64C 11/20; B64C 21/00; B64C 21/02; B64C 23/00; B64C 23/005; B64C 23/06; B64C 23/065; B64C 2330/16; B64C 2330/18; B64C 21/06; B64C 21/08; B64C 21/025; B64C 23/069; B64C 2003/148; B64C 2230/04; B64D 13/02; B64D 13/04; B64D 13/06; B64D 2013/0603; B64D 2013/0648; F15D 1/008; F15D 1/12
  See application file for complete search history.

(56) References Cited

U.S. PATENT DOCUMENTS

| 7,128,082 | B1* | 10/2006 | Cerretelli | B05B 1/08 137/14 |
|---|---|---|---|---|
| 7,255,309 | B2* | 8/2007 | Boldrin | B64C 21/08 244/208 |
| 8,844,571 | B2 | 9/2014 | Golling et al. | |
| 9,573,679 | B2 | 2/2017 | Golling et al. | |
| 9,718,538 | B2* | 8/2017 | Seifert | F15C 1/08 |
| 2013/0277502 | A1* | 10/2013 | Bauer | F15D 1/12 244/208 |
| 2013/0284294 | A1* | 10/2013 | Golling | F15C 1/12 137/833 |
| 2013/0291981 | A1* | 11/2013 | Lengers | F15B 21/12 137/825 |
| 2017/0174325 | A1 | 6/2017 | Bauer et al. | |

FOREIGN PATENT DOCUMENTS

| DE | 10 2017 001 066 A1 | 8/2018 |
|---|---|---|
| EP | 2 650 213 A1 | 10/2013 |
| EP | 3 184 420 A1 | 6/2017 |
| WO | 2012/048853 A1 | 4/2012 |

OTHER PUBLICATIONS

Extended European Search Report including Written Opinion for EP19198594.4 dated Feb. 18, 2020.

* cited by examiner

FLOW GUIDE BODY FOR AN AIRCRAFT

FIELD OF THE INVENTION

The present invention relates to a flow guide body for an aircraft, in particular a flow guide body for active flow control by pulsed air jet blowing. A further aspect of the invention relates to an aircraft comprising such a flow guide body.

BACKGROUND OF THE INVENTION

Active flow control (AFC) is commonly applied on aerodynamic surfaces where the flow is prone to separation due to high aerodynamic loading or unsteady geometry, such as wing, vertical tail plane (VTP) or horizontal tail plane (HTP), and where other measures, such as slats, flaps or vortex generators, cannot be implemented or are not preferred. For AFC, steady or pulsed blowing actuators are distributed in the aerodynamic surface ejecting jets of air at the same time at different positions to delay of suppress flow separation. When AFC with steady blowing actuators is applied to control large aerodynamic areas the amount of air required by the flow control device is undesirably high, in particular when the air is drawn from the bleed air system. By using pulsed blowing actuators the amount of required air can be reduced.

An example of a pulsed blowing actuator AFC system is known from WO 2012/048853 A1. WO 2012/048853 A1 describes an AFC system comprising a flow guide body with a plurality of flow control devices, wherein flow control devices of a first stage are fed by a common air supply line connected to their inlets, while the first and second outlets of a flow control device of a second stage are connected to the first and second control inlets of a flow control device of the first stage, so that the pulsed blowing of the flow control device of the first stage is controlled by the flow control device of the second stage.

BRIEF SUMMARY OF THE INVENTION

Aspects of the present invention may provide a flow guide body for active flow control, wherein a minimum amount of air is required without a significant loss in flow control efficiency.

An embodiment of the invention includes a flow guide body for an aircraft, wherein the flow guide body comprises a main body and a plurality of air flow control devices. The main body has an outer aerodynamic surface that is provided with a plurality of outlet openings. The flow control devices are preferably arranged in the main body. Each of the plurality of air flow control devices comprises an inlet, an interaction chamber, a first outlet and a second outlet. The interaction chamber extends from a first end to a second end along a preferably straight chamber axis. The inlet is connected with the interaction chamber at the first end. The first outlet is connected with the interaction chamber at the second end such that the first outlet projects towards a first side of the chamber axis. The second outlet is connected with the interaction chamber at the second end such that the second outlet projects towards a second side of the chamber axis opposite the first side. The interaction chamber is provided with a first control inlet connected to the interaction chamber at the first side of the chamber axis and configured to deflect the flow to exit the interaction chamber at the second outlet. At least one first flow control device of the plurality of air flow control devices is arranged such that the first and second outlets of the first flow control device are each connected to an outlet opening in the aerodynamic surface. The first outlet of the at least one first flow control device is provided with a first control outlet and the second outlet of the at least one first flow control device is provided with a second control outlet. At least one second flow control device of the plurality of air flow control devices is arranged such that the first or second outlet of the at least one second flow control device is connected with the inlet of the at least one first flow control device. One of the first and second control outlets of the at least one first flow control device is connected to the first control inlet of the at least one first flow control device. The other of the first and second control outlets of the at least one first flow control device is connected to the first or second control inlet, preferably to the first control inlet, of the at least one second flow control device or of a third or further flow control device. This means, in contrast to the prior art where the control inlets are supplied by the outlets of the subsequent stage, in the present invention the control inlets of all stages are supplied by the control outlets of the first stage.

By such a flow guide body, a pulsed blowing out of the outlet openings in the aerodynamic surface in the form of a wave is obtained, which relates to a pulsation form that requires only a minimum of air supply while at the same time flow control efficiency is not significantly affected.

According to an embodiment, at least two first flow control devices are provided. Preferably, the first outlet of the at least one second flow control device is connected with the inlet of one of the two first flow control devices. Preferably, the second outlet of the at least one second flow control device is connected with the inlet of the other of the two first flow control devices. Preferably, in each of the first flow control devices the first control outlet is connected with the first control inlet. Preferably, the second control outlet of that first flow control device the inlet of which is connected to the first outlet of the at least one second flow control device, is connected to the first control inlet of the at least one second flow control device. In such way, a two or more-stage system might be formed.

According to an embodiment of the invention, the interaction chamber of the at least one second flow control device is provided with a second control inlet connected to the interaction chamber at the second side of the chamber axis and configured to deflect the flow to exit the interaction chamber at the first outlet. Preferably, the second control outlet of that first flow control device the inlet of which is connected to the second outlet of the at least one second flow control device, is connected to the second control inlet of the at least one second flow control device. In such a way, a two-stage system having four outlets is formed.

According to an embodiment of the invention, the inlet of the at least one second flow control device is connected to a feed line connected to a supply of compressed air. The second stage thus represents the inlet stage that is supplied with compressed air from the feed line.

According to another embodiment, at least one third flow control device of the plurality of air flow control devices is arranged such that one of the first and second outlet of the at least one third flow control device is connected with the inlet of the at least one second flow control device. Preferably, the second control outlet of that first flow control device the inlet of which is connected to the second outlet of the at least one second flow control device, is connected to the first control inlet of the at least one third flow control device. It is further preferred that at least two second flow control devices and at least four first flow control devices are provided. Preferably, the first outlet of a second one of the at least two second flow control devices is connected with the inlet of a third one of the four first flow control devices. Preferably, the second outlet the second one of the at least two second flow control devices is connected with the inlet of a fourth one of the four first flow control devices. Preferably, the other of the first or second outlet of the at least one third flow control device is connected with the inlet of the second one of at least one second flow control device. Preferably, in each of the first flow control devices the first control outlet is connected with the first control inlet. Preferably, the second control outlet of that first flow control device the inlet of which is connected to the first outlet of the second one of the at least two second flow control devices, is connected to the first control inlet of the second one of the at least two second flow control devices. Preferably, the interaction chamber of the at least one third flow control device is provided with a second control inlet connected to the interaction chamber at the second side of the chamber axis and configured to deflect the flow to exit the interaction chamber at the first outlet. Preferably, the second control outlet of that first flow control device the inlet of which is connected to the second outlet of the second one of the at least two second flow control devices, is connected to the second control inlet of the at least one third flow control device. In such a way, a three-stage system having eight outlets is formed. It is understood that a flow guide body comprising four or more stages can be formed accordingly.

According to an embodiment, the inlet of the at least one third flow control device is connected to a feed line connected to a supply of compressed air. In this case, the third second stage represents the inlet stage that is supplied with compressed air from the feed line.

According to another embodiment, each of the plurality of flow control devices are configured such that when the inlet is initially supplied with compressed air, an airflow is guided from the inlet to the first outlet. In particular, the form of the interaction chamber of each of the plurality of flow control devices is preset to the first direction, preferably by an asymmetric course, such that when their respective inlet is initially supplied with compressed air, an airflow is guided from the inlet to the first outlet. In such a way, the waveformed pulsed blowing out of the outlet openings in the aerodynamic surface is generated. It is understood that the flow control devices might also be preset to the second direction, depending on the intended starting point and direction of movement of the wave.

According to yet another embodiment, the connections between the first and second control outlets and the first and second control inlets are formed by feedback channels. The feedback channels are preferably provided in the main body and adapted for a direct and minimum drag feedback.

According to another embodiment, the flow guide body is formed by a wing section with the outlet openings adjacent to a flap and/or a slat, e.g. along a main wing leading edge and/or along a main wing trailing edge. In such a way, flow separation in the area of a flap or a slat can be prevented.

According to yet another embodiment, the flow guide body is formed by a vertical stabilizer with the outlet openings arranged adjacent to a rudder, e.g. along a rudder hinge line. In such a way, flow separation in the area of a rudder can be prevented.

According to another embodiment, the flow guide body is formed by a horizontal stabilizer with the outlet openings arranged adjacent to an elevator, e.g. along an elevator hinge line. In such a way, flow separation in the area of an elevator can be prevented.

According to another embodiment, the flow guide body is formed by a wing having winglets at the distal end, wherein the outlet openings are arranged at the leading edge of the winglet. In such a way, flow separation at the winglet can be prevented.

A further aspect of the present invention relates to an aircraft comprising the flow guide body according to any of the embodiments described herein. The features and advantageous described in connection with the flow guide body apply vis-à-vis to the aircraft.

BRIEF DESCRIPTION OF THE DRAWINGS

Preferred embodiments of the present invention are described hereinafter in more detail by means of a drawing. The drawing shows in FIG. 1 a perspective view of an aircraft according to the invention, FIG. 2 a schematic illustration of a first embodiment of the flow guide body relating to a two-stage design, FIG. 3 an operation diagram of the flow guide body shown in FIG. 2, FIG. 4 a cross-sectional view of the flow guide body shown in FIG. 2, FIG. 5 a schematic view of the flow guide body shown in FIG. 2 as connected to a feed line of an aircraft bleed air system, and FIG. 6 a schematic view of a second embodiment of the flow guide body relating to a three-stage design.

DETAILED DESCRIPTION

Figure 1:
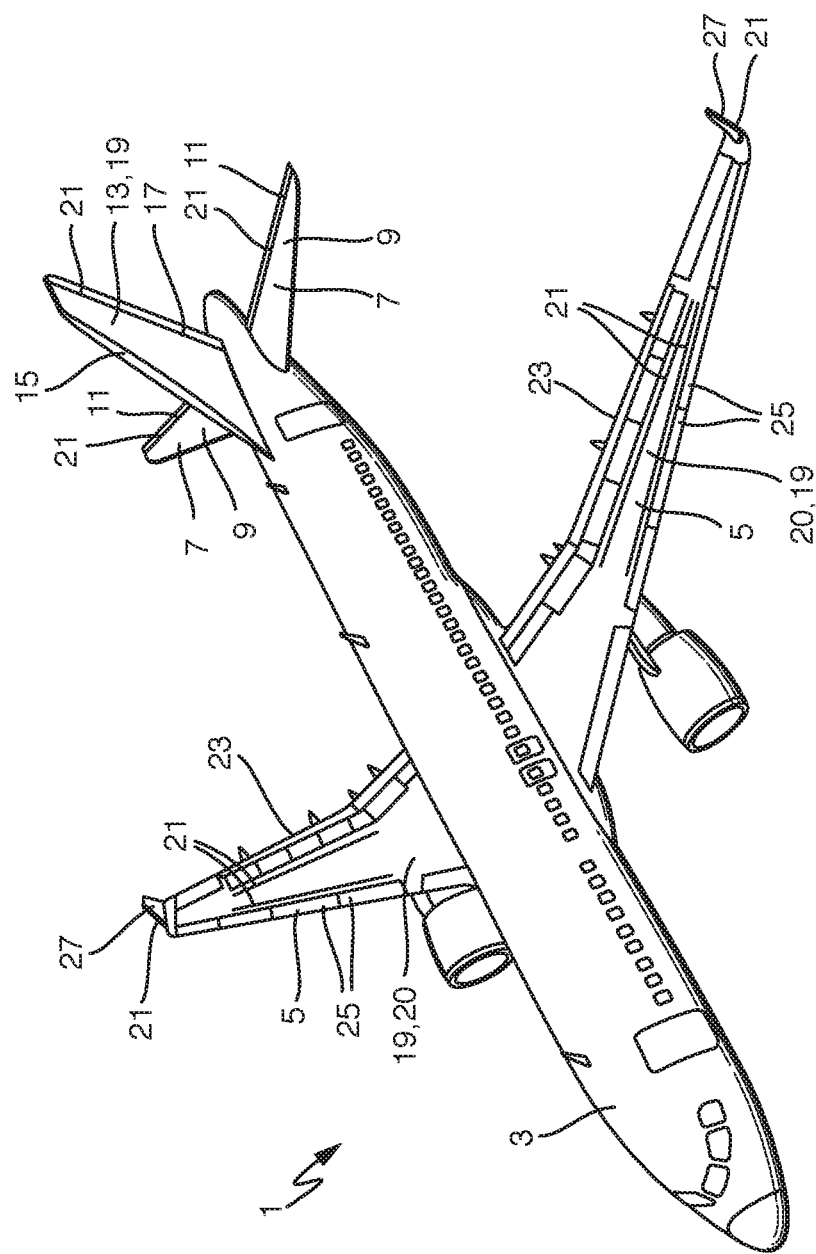

In FIG. 1 an aircraft 1 according to an embodiment of the present invention is shown. The aircraft 1 comprises a fuselage 3, wings 5, a horizontal tail plane 7 including a horizontal stabilizer 9 and an elevator 11, and a vertical tail plane 13 including a vertical stabilizer 15 and a rudder 17. Several flow guide bodies 19 according to an embodiment of the invention are included in the aircraft 1 a) in the form of a wing section 20 with outlet openings 21 adjacent to a flap 23 and a slat 25, b) in the form of the vertical stabilizer 15 with the outlet openings 21 arranged adjacent to a rudder 17, c) in the form of the horizontal stabilizer 9 with the outlet openings 21 arranged adjacent to an elevator 11, and d) in the form of the wing 5 having winglets 27 at the distal end, wherein the outlet openings 21 are arranged at the leading edge of the winglet 27.

One of the flow guide bodies 19 is shown in more detail in FIGS. 2 to 5. This flow guide body 19 relates to a two-stage design. The flow guide body 19 comprises a main body 29 and a plurality of air flow control devices 31, in the present case three flow control devices 31, two first flow control devices 31*a* relating to a first stage A and one second flow control device 31*b* relating to a second stage B. The main body 29 has an outer aerodynamic surface 33 that is provided with the plurality of outlet openings 21. The flow control devices 31 are arranged in the main body 29. Each of the flow control devices 31 comprises an inlet 35, an interaction chamber 37, a first outlet 39 and a second outlet 41. The interaction chamber 37 extends from a first end 43 to a second end 45 along a straight chamber axis 47. The inlet 35 is connected with the interaction chamber 37 at the first end 43. The first outlet 39 is connected with the interaction chamber 37 at the second end 45 such that the first outlet 39 projects towards a first side 49 of the chamber axis 47. The second outlet 41 is connected with the interaction chamber 37 at the second end 45 such that the second outlet 41 projects towards a second side 51 of the chamber axis 47 opposite the first side 49. The interaction chamber 37 is provided with a first control inlet 53 connected to the interaction chamber 37 at the first side 49 of the chamber axis 47. The first flow control devices 31a are arranged such that their first and second outlets 39, 41 are each connected to outlet openings 21 in the aerodynamic surface 33. Additionally, the first outlet 39 of each first flow control device 31a is provided with a first control outlet 55 and the second outlet 41 of each first flow control device 31a is provided with a second control outlet 57.

Figure 2:
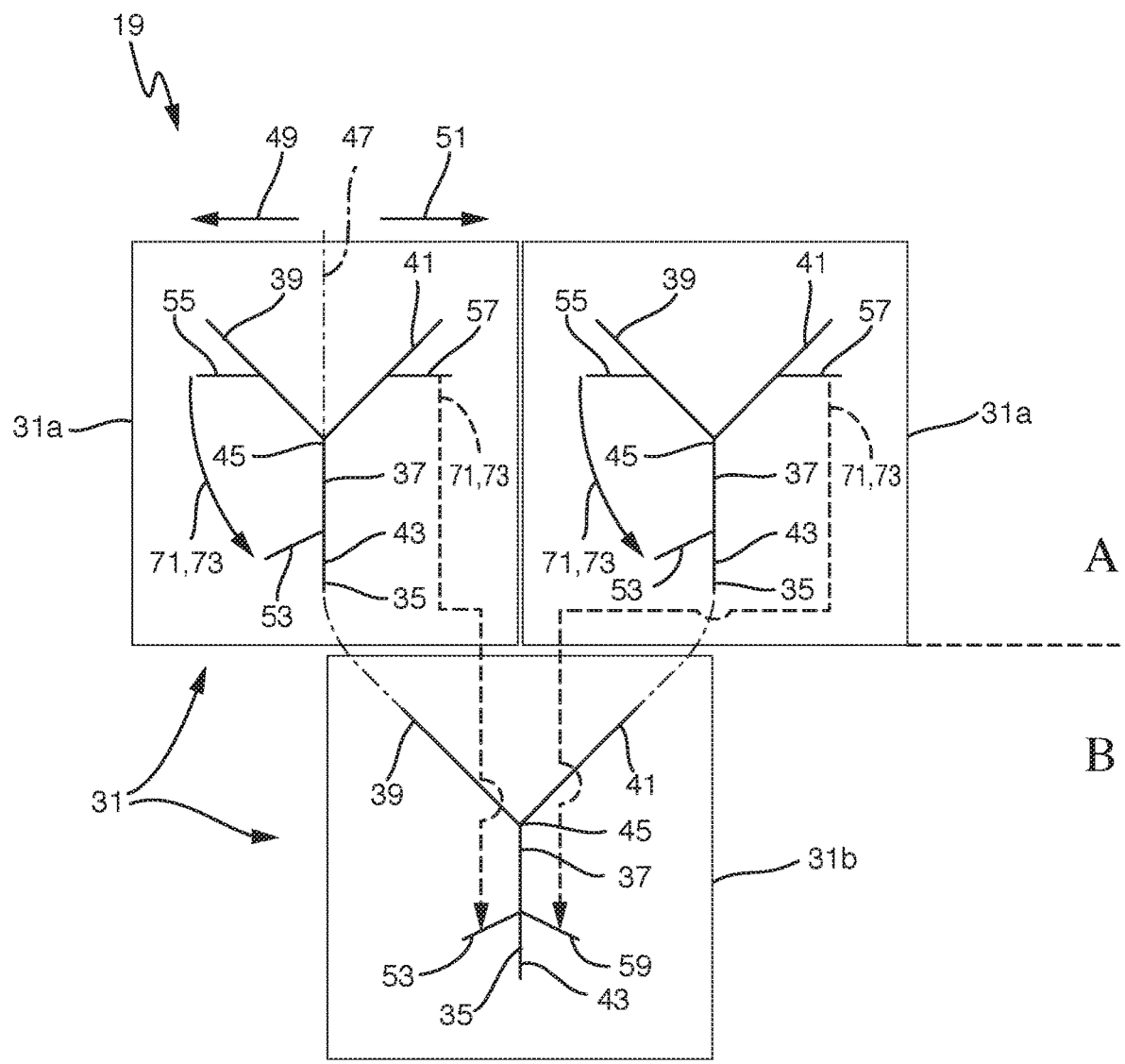
Figure 4:
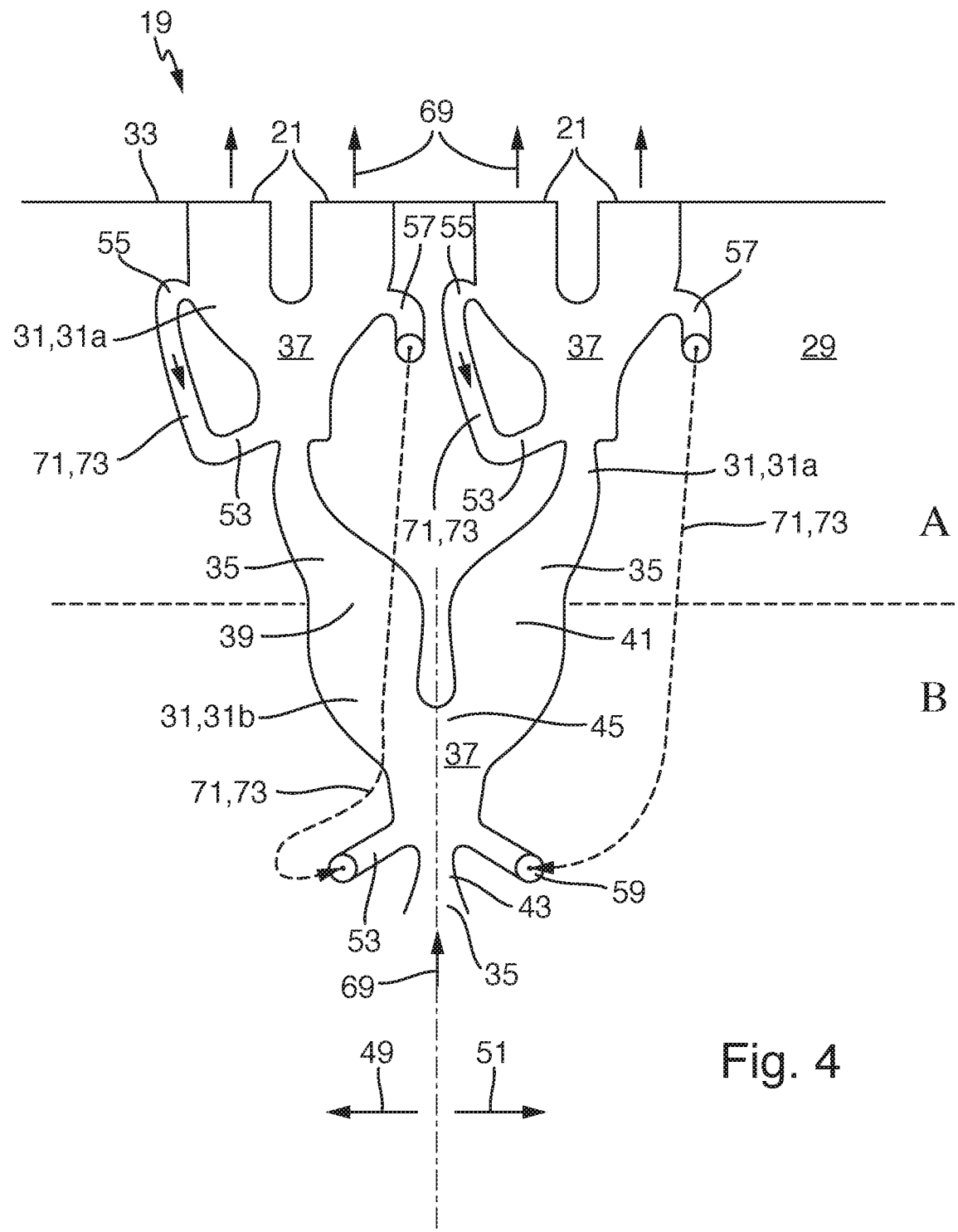
Figure 5:
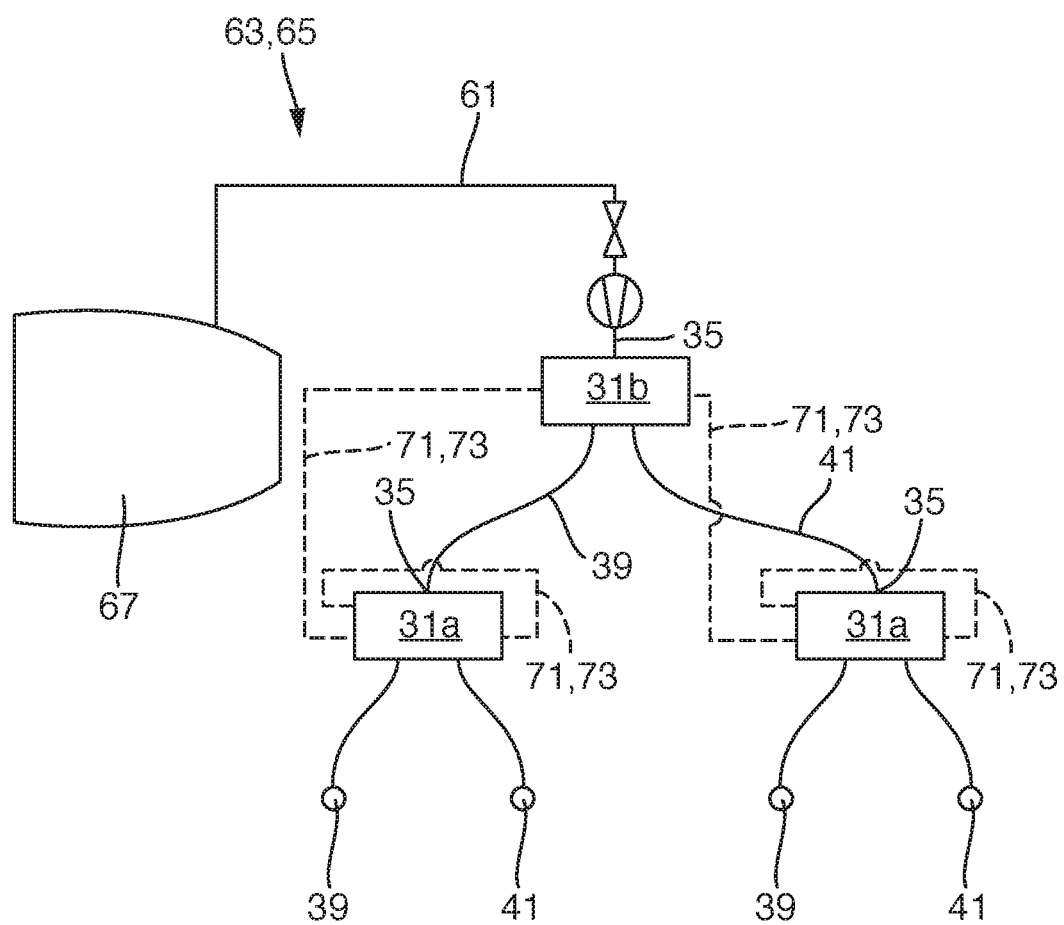

As shown in FIGS. 2 and 4, the first outlet 39 of the second flow control device 31b is connected with the inlet 35 of one of the two first flow control devices 31a. The second outlet 41 of the second flow control device 31b is connected with the inlet 35 of the other of the two first flow control devices 31a. In each of the first flow control devices 31a the first control outlet 55 is connected with the first control inlet 53. The second control outlet 57 of that first flow control device 31a the inlet 35 of which is connected to the first outlet 39 of the second flow control device 31b, is connected to the first control inlet 53 of the second flow control device 31b. The interaction chamber 37 of the second flow control device 31b is provided with a second control inlet 59 connected to the interaction chamber 37 at the second side 51 of the chamber axis 47. The second control outlet 57 of that first flow control device 31a the inlet 35 of which is connected to the second outlet 41 of the second flow control device 31b, is connected to the second control inlet 59 of the second flow control device 31b. The inlet 35 of the second flow control device 31b is connected to a feed line 61 connected to a supply 63 of compressed air, in the present case to a bleed air system 65 of an engine 67, as it is shown in FIG. 5.

Figure 3:
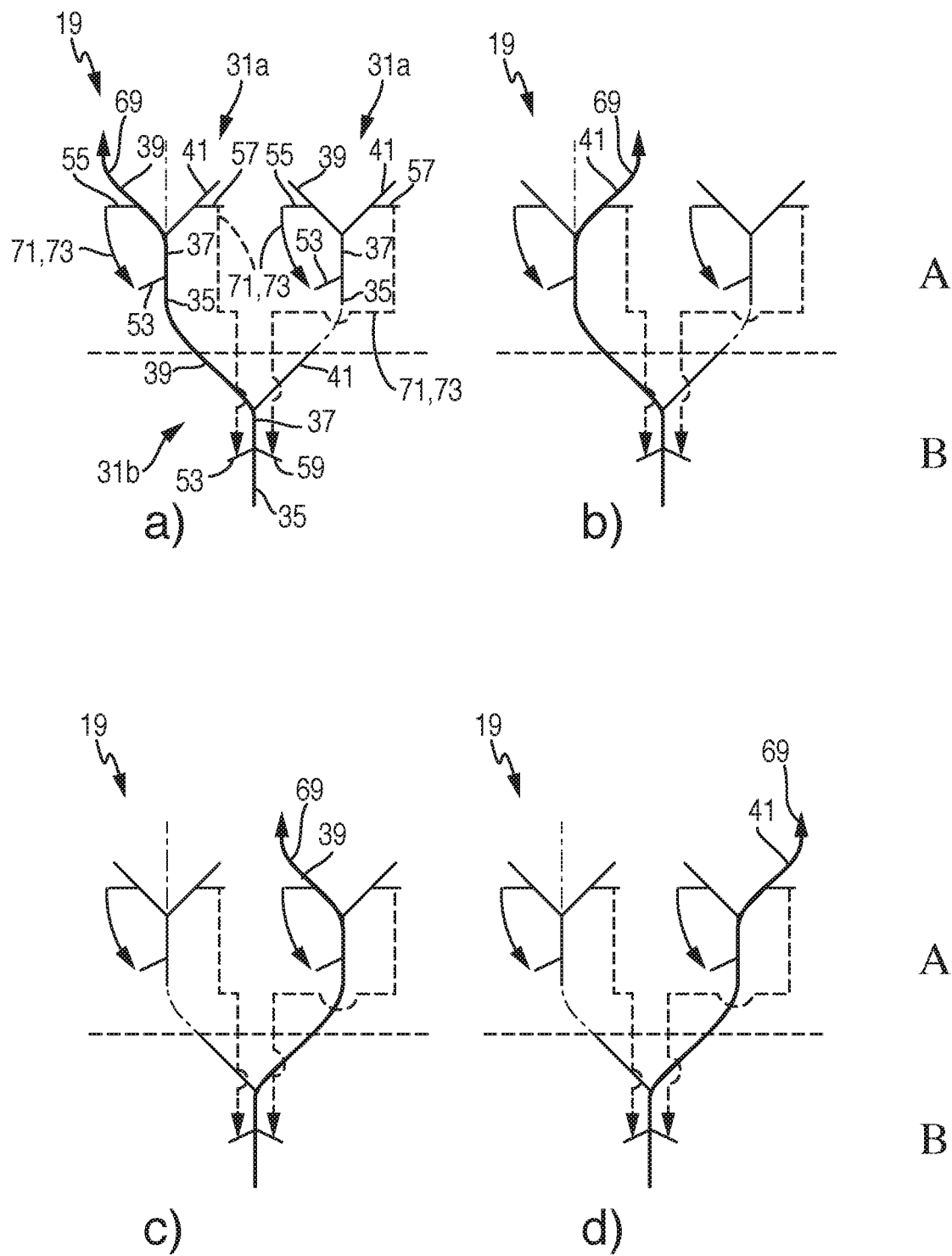

By such a two-stage flow guide body 19, pulsed blowing in the form of a wave can be generated, as shown in FIG. 3. The wave is formed by four subsequent blowing pulses of air travelling from the first side 49 to the second side 51, in the present illustration from left to right. Each of the flow control devices 31 is configured such that when the inlet 35 is initially supplied with compressed air, an airflow 69 is guided from the inlet 35 to the first outlet 39. This is done by the interaction chamber 37 of the flow control devices 31 being formed with a preset asymmetry to urge the airflow 69 to the first side 49 and thus to the first outlet 39.

As the flow guide body is initially preset to the first side 49, the air flow 69 initially exits the flow guide body 19 at the first outlet 39 of the first one of the first flow control devices 31a, see FIG. 3 a). Simultaneously to the air flow 69 exiting the first outlet 39 of the first one of the first flow control devices 31a, a partial air flow 71 also exits the first control outlet 55 of the first one of the first flow control devices 31a and is passed to the first control inlet 53 of the first one of the first flow control devices 31a via a feedback channel 73.

The partial air flow 71 through the first control inlet 53 of the first one of the first flow control devices 31a actuates the airflow 69 through the interaction chamber 37 to exit the flow guide body 19 through the second outlet 41 of the first one of the first flow control devices 31a, see FIG. 3 b). Simultaneously to the airflow 69 exiting the second outlet 41 of the first one of the first flow control devices 31a, a partial air flow 71 also exits the second control outlet 57 of the first one of the first flow control devices 31a and is passed to the first control inlet 53 of the second flow control device 31b via a feedback channel 73.

The partial air flow 71 through the first control inlet 53 of the second flow control device 31b actuates the airflow 69 through the interaction chamber 37 of the second flow control device 31b to exit the second flow control device 31b through its second outlet 41 and enter the inlet 35 of the second one of the first flow control devices 31a, where the airflow 69 exits the flow guide body 19 through the first outlet 39 due to the presetting to the first side 49, see FIG. 3 c). Simultaneously to the airflow 69 exiting the first outlet 39 of the second one of the first flow control devices 31a, a partial air flow 71 also exits the first control outlet 55 of the second one of the first flow control devices 31a and is passed to the first control inlet 53 of the second one of the first flow control devices 31a via a feedback channel 73.

The partial air flow 71 through the first control inlet 53 of the second one of the first flow control devices 31a actuates the airflow 69 through the interaction chamber 37 to exit the flow guide body 19 through the second outlet 41 of the second one of the first flow control devices 31a, see FIG. 3 d). Simultaneously to the airflow 69 exiting the second outlet 41 of the second one of the first flow control devices 31a, a partial air flow 71 also exits the second control outlet 57 of the second one of the first flow control devices 31a and is passed to the second control inlet 59 of the second flow control device 31b via a feedback channel 73.

Finally, the partial air flow 71 through the second control inlet 59 of the second flow control device 31b actuates the airflow 69 through the interaction chamber 37 of the second flow control device 31b to switch to its initial path and exit the second flow control device 31b through its first outlet 39 and enter the inlet 35 of the first one of the first flow control devices 31a, so that a new wave begins.

Figure 6:
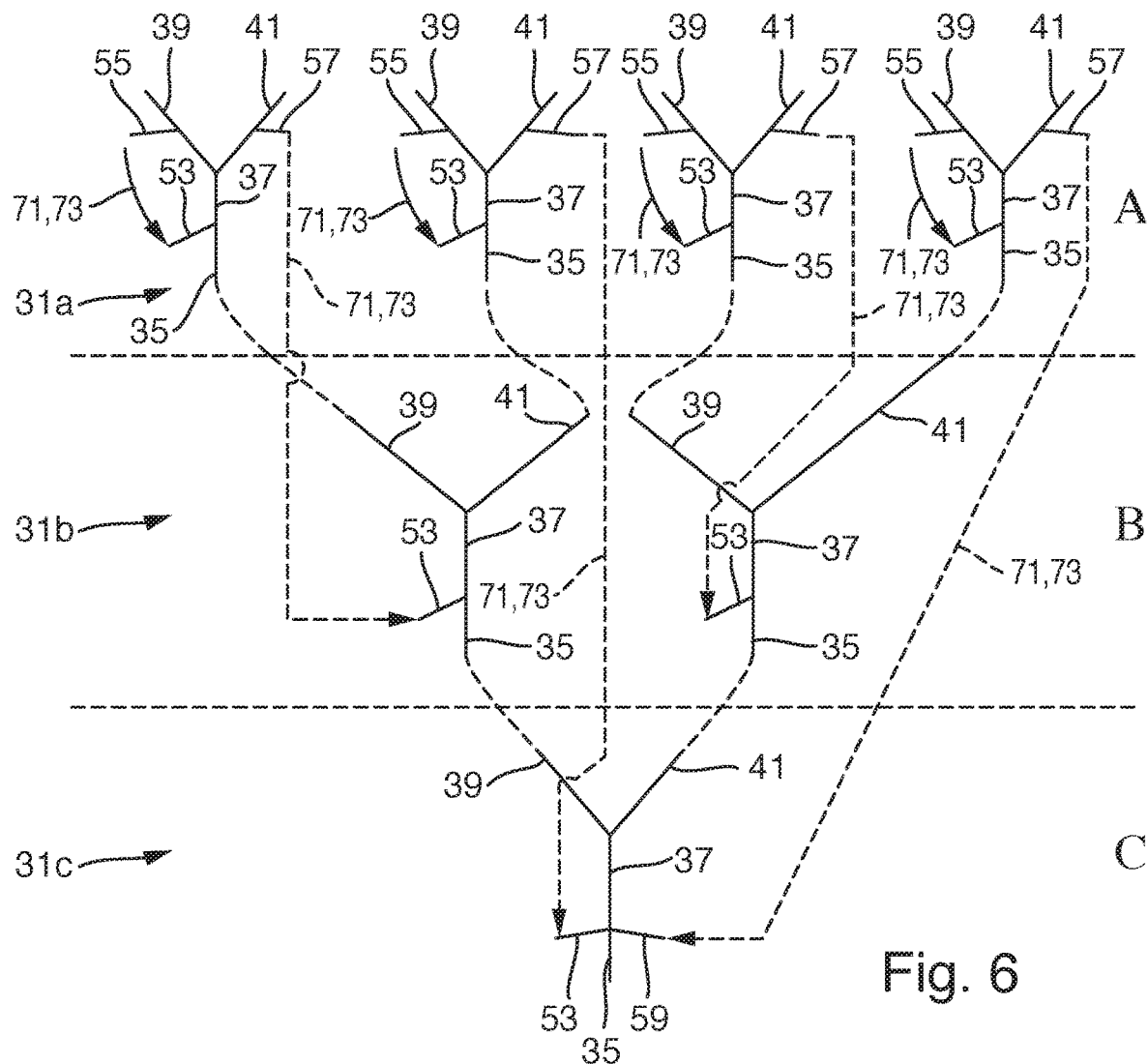

FIG. 6 shows an embodiment of the flow guide body 19 relating to a three-stage design, comprising six flow control devices 31, four first flow control devices 31a relating to a first stage A, two second flow control devices 31b relating to a second stage A, and one third flow control device 31c relating to a third stage C. The three-stage design widely incorporates the two-stage design as described above, so that only the differences of the three stage design with respect to the two-stage design are described hereinafter.

The third flow control device 31c is arranged such that the first outlet 39 of the third flow control device 31c is connected with the inlet 35 of the first one of the second flow control devices 31b. The second control outlet 57 of that first flow control device 31a the inlet 35 of which is connected to the second outlet 41 of the first one of the second flow control devices 31b, instead of being connected to the second control inlet 59 of the first one of the second flow control devices 31b, is connected to the first control inlet 53 of the third flow control device 31c. The first outlet 39 of a second one of the two second flow control devices 31b is connected with the inlet 35 of a third one of the four first flow control devices 31a. The second outlet 41 of the second one of the two second flow control devices 31b is connected with the inlet 35 of a fourth one of the four first flow control devices 31a. The second outlet 41 of the third flow control device 31c is connected with the inlet 35 of the second one of the two second flow control devices 31b. In each of the first flow control devices 31a the first control outlet 55 is connected with the first control inlet 53. The second control outlet 57 of that first flow control device 31a the inlet 35 of which is connected to the first outlet 39 of the second one of the two second flow control devices 31b, is connected to the first control inlet 53 of the second one of the two second flow control devices 31b. Instead of the interaction chamber 37 of the second flow control device 31b, the interaction chamber 37 of the third flow control device 31c is provided with a second control inlet 59 connected to the interaction chamber 37 at the second side 51 of the chamber axis 47. The second control outlet 57 of that first flow control device 31a the inlet 35 of which is connected to the second outlet 41 of the second one of the two second flow control devices 31b, is connected to the second control inlet 59 of the third flow control device 31c. The inlet 35 of the third flow control device 31c is connected to a feed line 61 connected to a supply 63 of compressed air, such as an engine bleed air system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flow guide body for an aircraft, comprising:
   a main body having an outer aerodynamic surface, the aerodynamic surface having a plurality of outlet openings; and
   a plurality of flow control devices, each of the plurality of flow control devices comprising:
      an inlet;
      an interaction chamber having a first end and a second end and extending from the first end to the second end along a chamber axis;
      a first outlet; and
      a second outlet,
      wherein the inlet is connected with the interaction chamber at the first end,
      wherein the first outlet is connected with the interaction chamber at the second end such that the first outlet projects towards a first side of the chamber axis,
      wherein the second outlet is connected with the interaction chamber at the second end such that the second outlet projects towards a second side of the chamber axis opposite the first side, and
      wherein the interaction chamber is provided with a first control inlet connected to the interaction chamber at the first side of the chamber axis,
   wherein at least one first flow control device of the plurality of flow control devices is arranged such that the first and second outlets of the first flow control device are each connected to an outlet opening in the aerodynamic surface,
   wherein the first outlet of the at least one first flow control device is provided with a first control outlet and the second outlet of the at least one first flow control device is provided with a second control outlet,
   wherein at least one second flow control device of the plurality of flow control devices is arranged such that the first or second outlet of the at least one second flow control device is connected with the inlet of the at least one first flow control device,
   wherein one of the first and second control outlets of the at least one first flow control device is connected to the first control inlet of the at least one first flow control device,
   wherein the other of the first and second control outlets of the at least one first flow control device is connected to the first or a second control inlet of the at least one second flow control device or of a third or further flow control device,
   wherein the at least one first flow control device comprises at least two first flow control devices,
   wherein the first outlet of the at least one second flow control device is connected with the inlet of one of the at least two first flow control devices,
   wherein the second outlet of the at least one second flow control device is connected with the inlet of the other of the at least two first flow control devices,
   wherein in each of the at least two first flow control devices the first control outlet is connected with the first control inlet, and
   wherein the second control outlet of that first flow control device the inlet of which is connected to the first outlet of the at least one second flow control device, is connected to the first control inlet of the at least one second flow control device.

2. The flow guide body according to claim 1, wherein the interaction chamber of the at least one second flow control device comprises a second control inlet connected to the interaction chamber at the second side of the chamber axis, and
   wherein the second control outlet of that first flow control device the inlet of which is connected to the second outlet of the at least one second flow control device, is connected to the second control inlet of the at least one second flow control device.

3. The flow guide body according to claim 1, wherein the inlet of the at least one second flow control device is connected to a feed line connected to a supply of compressed air.

4. The flow guide body according to claim 1, wherein at least one third flow control device of the plurality of air flow control devices is arranged such that one of the first and second outlet of the at least one third flow control device is connected with the inlet of the at least one second flow control device.

5. The flow guide body according to claim 4, wherein the second control outlet of that first flow control device the inlet of which is connected to the second outlet of the at least one second flow control device, is connected to the first control inlet of the at least one third flow control device.

6. The flow guide body according to claim 5, wherein the at least one second flow control devices comprises at least two second flow control devices and the at least one first control devices comprises at least four first flow control devices,
   wherein the first outlet of a second one of the at least two second flow control devices is connected with the inlet of a third one of the four first flow control devices,
   wherein the second outlet of the second one of the at least two second flow control devices is connected with the inlet of a fourth one of the four first flow control devices,
   wherein the other of the first or second outlet of the at least one third flow control device is connected with the inlet of the second one of at least one second flow control device, wherein in each of the first flow control devices the first control outlet is connected with the first control inlet, wherein the second control outlet of that first flow control device the inlet of which is connected to the first outlet of the second one of the at least two second flow control devices, is connected to the first control inlet of the second one of the at least two second flow control devices, wherein the interaction chamber of the at least one third flow control device is provided with a second control inlet connected to the interaction chamber at the second side of the chamber axis, and wherein the second control outlet of that first flow control device the inlet of which is connected to the second outlet of the second one of the at least two second flow control devices, is connected to the second control inlet of the at least one third flow control device.

7. The flow guide body according to claim 6, wherein the inlet of the at least one third flow control device is connected to a feed line connected to a supply of compressed air.

8. The flow guide body according to claim 1, wherein each of the plurality of flow control devices are configured such that when the inlet is initially supplied with compressed air, an airflow is guided from the inlet to the first outlet.

9. The flow guide body according to claim 1, wherein the connections between the first and second control outlets and the first and second control inlets are formed by feedback channels.

10. The flow guide body according to claim 1, wherein the flow guide body is formed by a wing section with the outlet openings adjacent to a flap and/or a slat.

11. The flow guide body according to claim 1, wherein the flow guide body is formed by a vertical stabilizer with the outlet openings arranged adjacent to a rudder.

12. The flow guide body according to claim 1, wherein the flow guide body is formed by a horizontal stabilizer with the outlet openings arranged adjacent to an elevator.

13. The flow guide body according to claim 1, wherein the flow guide body is formed by a wing having winglets at the distal end wherein the outlet openings are arranged at the leading edge of the winglet.

14. An aircraft comprising the flow guide body according to claim 1.

* * * * *